(12) United States Patent
Brands et al.

(10) Patent No.: US 11,577,789 B2
(45) Date of Patent: Feb. 14, 2023

(54) VEHICLE COMPONENT COMPRISING METAL INSERT AND STRUT COMPONENT

(71) Applicant: SABIC GLOBAL TECHNOLOGIES B.V., Bergen op Zoom (NL)

(72) Inventors: Davy Wilhelmus Anna Brands, Maastricht (NL); Ilona Maria Francois Grond-Soons, Maastricht (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 145 days.

(21) Appl. No.: 17/260,432

(22) PCT Filed: Jul. 25, 2019

(86) PCT No.: PCT/EP2019/070016
§ 371 (c)(1),
(2) Date: Jan. 14, 2021

(87) PCT Pub. No.: WO2020/021000
PCT Pub. Date: Jan. 30, 2020

(65) Prior Publication Data
US 2021/0291911 A1    Sep. 23, 2021

(30) Foreign Application Priority Data

Jul. 26, 2018    (EP) .................................... 18185785

(51) Int. Cl.
*B62D 29/04* (2006.01)
*B62D 29/00* (2006.01)
(Continued)

(52) U.S. Cl.
CPC ............ *B62D 29/004* (2013.01); *B60J 5/101* (2013.01); *B60J 5/107* (2013.01); *B60J 5/04* (2013.01);
(Continued)

(58) Field of Classification Search
CPC . B62D 29/004; B60J 5/10; B60J 5/107; B60J 5/101
(Continued)

(56) References Cited

U.S. PATENT DOCUMENTS 6,216,810 B1 * 4/2001 Nakai .................. B62D 29/004
296/193.04
6,634,702 B1    10/2003 Pleschke et al.
(Continued)

FOREIGN PATENT DOCUMENTS

| | | |
|---|---|---|
| CN | 203765846 U | 8/2014 |
| EP | 1927453 B1 | 1/2012 |
| WO | 20160079083 A1 | 5/2016 |

OTHER PUBLICATIONS

International Search Report; International Application No. PCT/EP2019/070016; International Filing Date: Jul. 25, 2019; dated Oct. 16, 2019; 3 pages.
(Continued)

*Primary Examiner* — Jason S Morrow
(74) *Attorney, Agent, or Firm* — Cantor Colburn LLP

(57) ABSTRACT

The invention relates to a vehicle component, comprising a thermoplastic part; a metal insert having an anchoring portion, a peripheral portion, and a first insert surface and an opposite second insert surface, wherein the first surface is overmolded by the thermoplastic part, a thermoplastic rib overmolded on a second surface of the metal insert the rib extending from the second surface and being at least partly adjacent to the thermoplastic part; and a strut component attached to the metal insert at the anchoring portion on the first surface of tire metal insert. The invention further relates to a vehicle comprising such a vehicle component, wherein the vehicle is one of a railway vehicle, a marine vehicle, a road vehicle, or an aircraft.

18 Claims, 7 Drawing Sheets

(51) Int. Cl.
  *B60J 5/10* (2006.01)
  *B60J 5/04* (2006.01)
  *B62D 25/12* (2006.01)
  *B62D 33/023* (2006.01)

(52) U.S. Cl.
  CPC .................. *B60J 5/10* (2013.01); *B62D 25/12* (2013.01); *B62D 33/023* (2013.01)

(58) Field of Classification Search
  USPC .......................................................... 296/56
  See application file for complete search history.

(56) References Cited

U.S. PATENT DOCUMENTS

| | | | | |
|---|---|---|---|---|
| 6,681,876 | B1* | 1/2004 | Haneda | B62D 29/004 180/68.4 |
| 6,688,680 | B1* | 2/2004 | Cooper | B62D 29/004 296/70 |
| 6,729,424 | B2* | 5/2004 | Joutaki | B62D 29/004 180/311 |
| 6,796,604 | B2* | 9/2004 | Igura | B62D 29/001 296/203.02 |
| 7,182,545 | B2* | 2/2007 | Riviere | B29C 45/14311 403/267 |
| 7,287,613 | B2* | 10/2007 | Kim | B62D 25/084 180/68.6 |
| 7,445,274 | B2* | 11/2008 | Feith | B62D 29/001 296/193.02 |
| 8,550,536 | B2 | 10/2013 | Gachter et al. | |
| 2003/0008105 | A1* | 1/2003 | Haack | B32B 15/14 428/458 |
| 2003/0159261 | A1 | 8/2003 | Kappenstein | |
| 2004/0037625 | A1* | 2/2004 | Corrias | B62D 29/004 403/172 |
| 2005/0229530 | A1* | 10/2005 | Schmidt | B29C 45/14311 52/630 |
| 2006/0102401 | A1 | 5/2006 | Pellillo et al. | |
| 2006/0115622 | A1 | 6/2006 | Grando | |
| 2006/0147672 | A1* | 7/2006 | Ruiz | B29C 65/607 264/296 |
| 2007/0182180 | A1* | 8/2007 | Eipper | B29C 45/14467 296/2 |
| 2008/0116701 | A1* | 5/2008 | Boumaza | B62D 29/004 293/120 |
| 2010/0173126 | A1 | 7/2010 | Malek et al. | |
| 2011/0254311 | A1 | 10/2011 | Dajek et al. | |
| 2012/0219748 | A1 | 8/2012 | Gillard | |

OTHER PUBLICATIONS

M. Grujicic; "Injection Over Molding of Polymer-Metal Hybrid Structures"; American Journal of Science and Technology, 2014; vol. 1, No. 4: pp. 168-181.

Written Opinion; International Application No. PCT/EP2019/070016; International Filing Date: Jul. 25, 2019; dated Oct. 16, 2019; 5 pages.

* cited by examiner

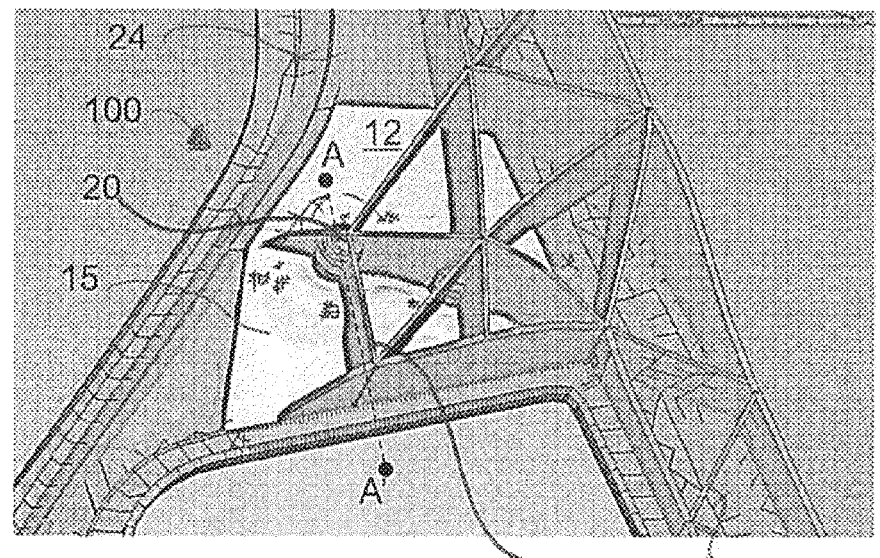
FIG. 3A
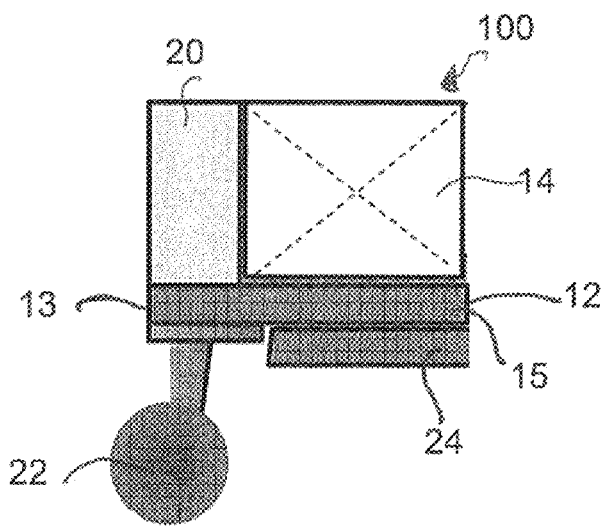
FIG. 3B  A-A'

VEHICLE COMPONENT COMPRISING METAL INSERT AND STRUT COMPONENT

CROSS REFERENCE TO RELATED APPLICATIONS

This application is a national stage application of International Application No. PCT/EP2019/070016, filed Jul. 25, 2019, which claims priority to European Application Serial No. 18185785.5, filed Jul. 26, 2018, both of which are incorporated by reference in their entirety.

BACKGROUND

Weight reduction is key to automotive due to stringent worldwide carbon dioxide emission regulations. As a result, most lightweight solutions today use optimized aluminum or high strength steel designs for tailgate applications. Weight reduction is sought by using aluminum to maintain the required mechanical properties. Using aluminum is costly, due to material costs and the need of parts that are individually clad (usually made of thermoplastic polyolefins (TPO)) to meet aesthetical interior requirements.

To further reduce the weight, and to additionally reduce costs, plastic tailgates were sought after. Initially, plastic tailgates were developed from thermoset SMC-like materials. Sheet molding composite (SMC) is a ready to mold glass-fiber reinforced, thermoset, polyester material. Later on, thermoplastic parts were made of Long fiber reinforced PP (PP-LGF) that partially integrate the aesthetical TPO panels.

When using thermoplastic to make structural parts for vehicle components, creep behavior of the thermoplastic material under constant load must be taken into account. For instance, a gas strut exerts a continuous force acting on a tailgate of a vehicle during the lifetime of the tailgate, even when the tailgate is in a closed position. In a thermoplastic structural part, such a load can cause local creep, which can lead to part failure from stress in the thermoplastic structural part.

It would be desirable to provide a vehicle component with an improved attachment of a strut component to a thermoplastic structural part to decrease stress in the thermoplastic structural part in order to improve time to failure behavior, which can prolong the lifetime of the tailgate, and that mitigates the aforementioned disadvantages.

SUMMARY

The invention relates to a vehicle component, comprising a thermoplastic part, a metal insert having an anchoring portion, a peripheral portion, and a first insert surface and an opposite second insert surface, wherein the first surface is overmolded by the thermoplastic part, a thermoplastic rib overmolded on a second surface of the metal insert, the rib extending from the second surface and being at least partly adjacent to the thermoplastic part, and a strut component attached to the metal insert at the anchoring portion on the first surface of the metal insert.

A strut component, for instance a ball strut, a gas strut, or a combination with at least one of those, connected to a vehicle component, for instance a tailgate, exerts a force concentrated at a relatively small surface where the strut component and the vehicle component connect, resulting in a relatively concentrated stress. Strut components exert a continuous force acting on the vehicle component during its full lifetime, in both active and inactive modes, e.g. an open tailgate where the strut component actively supports the tailgate from falling back in the closed position, and when the tailgate is inactive in the closed position and not actively supporting the tailgate. Especially for plastic vehicle components or plastic structural carrier parts, this force causes creep that may lead to part failure if the stress inside the carrier part becomes too high.

By combining the strut component with a metal insert, the stress within the vehicle component exerted by the strut component is distributed over a relatively larger surface, such that creep and time to failure behavior are improved. The life performance of the vehicle component is thus improved. The metal insert may be combined with the strut component directly to eliminate a step in assembly process. For example, the strut component can be attached at the anchoring portion to the metal insert before the overmolding step. This may be done by welding, clinching or riveting. Alternatively, the strut component is integrally formed with the metal insert, wherein the strut component is located at the anchoring portion.

The thermoplastic rib overmolded on the second side of the metal insert is used to fixate the metal insert into the vehicle component, i.e. the metal insert is locked between the thermoplastic part and the thermoplastic rib. The thermoplastic rib is at least partly adjacent the thermoplastic part. The thermoplastic part may have a first part surface and an opposite second part surface. The thermoplastic part may extend from the second insert surface and the second part surface, i.e. the thermoplastic rib overlaps with both the metal insert and the thermoplastic part.

In an embodiment, an exterior edge of the peripheral portion is at least a minimum planar distance from an edge of the anchoring portion closest to said exterior edge of the peripheral portion, wherein the minimum planar distance is 3.0 mm to 50 mm, or 3.0 mm to 40 mm, or 3.0 mm to 30 mm, preferably at least 4.0 mm. For a sufficient distribution of the internal stress in the thermoplastic part and thus a reduction in creep and an increase in component life performance, the metal insert may have a minimal dimension, defined as the minimum planar distance from the edge of the anchoring portion closest to the exterior edge of the peripheral portion. The minimum planar distance may be a radius when the metal insert is circular or elliptically shaped. Other metal insert shapes are possible as well, such as triangular, rectangular or any other polygonal shape. The shape may be regular, or irregular. The shape of the metal insert may depend on the shape of the thermoplastic part, and/or the requirements for the vehicle component. The metal insert may be a plate. The metal insert may be provided with an indentation and/or a protrusion. For instance, the anchoring portion may be off set with regard to the peripheral portion. Furthermore, the metal insert may include a cylindrical anchoring portion, such as a threaded cylinder extending from the second insert surface.

In addition to the shape and planar dimensions, the thickness of the metal insert may play a role in the optimization of the stress distribution. The thickness of at least 0.05 and at max 5 mm. or 0.1 mm to 5 mm, or 0.2 mm to 4 mm, preferably 0.3 mm to 3 mm.

The metal insert may comprise stainless steel, titanium, iron, nickel, copper, aluminum, tin, or a combination comprising at least one of the foregoing. The choice of metal for the metal insert may depend on the requirements to the distribution of the internal stress and thus the life performance of the vehicle component, as well as the used plastic material to overmold the metal insert, as not all metals are compatible with every polymer. Cost requirements may play a role as well.

The vehicle component may comprise a plurality of thermoplastic ribs that are overmolded onto the second insert surface. Such a plurality of ribs may improve the fixation of the metal insert to the thermoplastic part. Additionally, or alternatively, the thermoplastic rib overmolded on a second insert surface forms part of a reinforcement rib extending over at least part of the thermoplastic part. The thermoplastic part may be reinforced with a reinforcement structure that comprises a reinforcement rib. The vehicle component may further comprise a network of thermoplastic ribs connected to a lateral side of the thermoplastic rib and extending from the thermoplastic rib over at least part of the thermoplastic part. The network of thermoplastic ribs may form part of the reinforcement structure.

In an embodiment, the thermoplastic rib may be provided with a thermoplastic boss and/or a thermoplastic gusset, and wherein the thermoplastic rib, the thermoplastic boss and/or the thermoplastic gusset is adjacent to the anchoring portion. The thermoplastic rib may be provided with to accommodate any indentations or protrusions on the metal insert, in particular at the anchoring position.

The vehicle component may comprise a polybutylene terephthalate (PBT); acrylonitrile-butadiene-styrene (ABS); polycarbonate (LEXAN™ and LEXAN™ EXL resins, commercially available from SABIC Innovative Plastics); polycarbonate/PET blends; polycarbonate/ABS blends; acrylic-styrene-acrylonitrile (ASA); phenylene ether resins; blends of polyphenylene ether/polyamide (NORYL GTX™ resins, commercially available from SABIC Innovative Plastics); blends of polycarbonate/polyethylene terephthalate (PET)/ polybutylene terephthalate (PBT) (XENOY™ resins, commercially available from SABIC Innovative Plastics); polyamides; phenylene sulfide resins; polyvinyl chloride PVC; (high impact) polystyrene; polyolefins such as polypropylene (PP), expanded polypropylene (EPP) or polyethylene; polysiloxane; polyurethane and thermoplastic olefins (TPO), as well as combinations comprising at least one of the foregoing. The vehicle component may comprise a fiber filled thermoplastic material, in particular from the list above. For example, a fiber-filled polyolefin can be used. The fiber material may include glass fiber, long or short, carbon fiber, aramid fiber, or any plastic fiber. In particular, long glass fiber filled polypropylene (STAMAX™) may be used.

The thermoplastic part and the thermoplastic rib may comprise or be made of dissimilar but compatible thermoplastic materials. Only when compatible materials are used, the required bonding or joint between the thermoplastic part and the thermoplastic rib may be established.

The vehicle component may be a tailgate, a door, a tail lift or a hood.

The invention also relates to a vehicle comprising the vehicle component as described above, wherein the vehicle is one of a railway vehicle, a marine vehicle, a road vehicle, or an aircraft.

BRIEF DESCRIPTION OF THE DRAWINGS

The following figures are exemplary embodiments.

FIG. 3A is shows part of a vehicle component according to the invention.

FIG. 3B is a cross-section of the vehicle component along line A-A' shown in FIG. 3A.

The above described and other features are exemplified by the following detailed description, examples, and claims.

DETAILED DESCRIPTION

Figure 1:
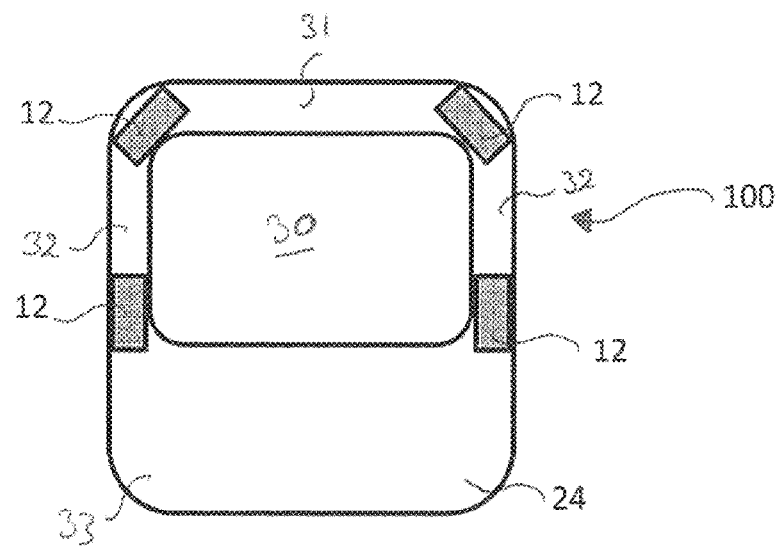
FIG. 1 shows a schematic representation of a vehicle component comprising localized metal inserts.

FIG. 1 shows a schematic representation of a vehicle component 100 comprising localized metal inserts 12 and a thermoplastic part 24 overmolded onto the metal inserts 12. The metal inserts or reinforcements 12 are placed at load introduction points of struts and/or hinges to distribute load in thermoplastic part. As the metal inserts 12 are limited to the load areas of struts and/or hinges, these inserts do not add increased stiffness to the vehicle component. The vehicle component 100 may be stiffened with reinforcement ribs, see FIG. 3A.

The vehicle component 100 may be a tailgate for a vehicle, as shown schematically in FIG. 1. The tailgate can comprise a thermoplastic inner structure forming the carrier frame of the tailgate, depicted as the thermoplastic part 24 in FIG. 1, and at least one reinforcement 12 for local reinforcement of the carrier frame. The inner structure or thermoplastic part 24 for a tailgate comprises a tailgate window opening 30 in which a window glazing part of the tailgate may be placed. The reinforcements may be distributed around or adjacent to the tailgate window opening.

The carrier frame or thermoplastic part 24 may comprise a top beam 31, two D-pillars 32 extending from each end of the top beam, and a lower portion 33 extending between the two D-pillars at a distance different from zero from the top beam. The top beam, D-pillars and the lower portion enclose the tailgate window opening 30 for a window glazing part of the tailgate.

The vehicle component may also be a door component (not shown), having a door window opening in which a window glazing part of the door may be placed. Similar distribution of the reinforcements 12 around the window opening as for the tailgate can be done for the door.

Figure 2:
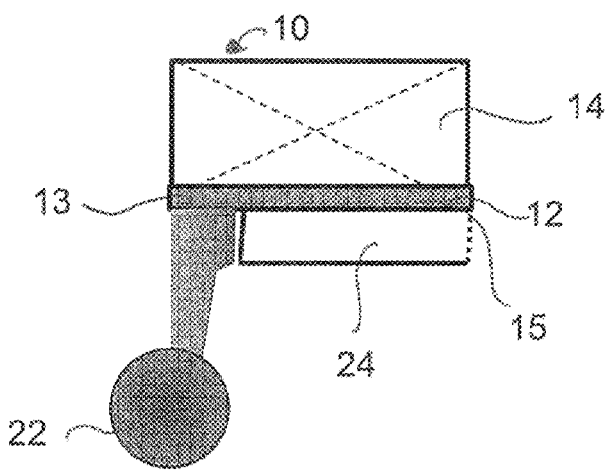
FIG. 2 shows a detail of an embodiment according to the invention.

FIG. 2 shows a detail of an embodiment according to the invention. As shown in FIG. 2, a strut component 22 (e.g., a ball strut, not shown in FIG. 3A) is attached to a metal insert 12 through an anchoring portion 13. The strut component 22 can be attached to the anchoring position at a surface opposite of the shown surface. A thermoplastic structural part 24 (e.g., a doorframe or a tailgate) is over-molded on a first surface of the metal insert 12 and a thermoplastic rib 14 is overmolded on, e.g., onto, a second surface of the metal insert 12. The ball strut 22 is positioned opposite of the thermoplastic rib 14 (e.g., the metal insert 12 is located between the ball strut 22 and the thermoplastic rib 14) and is integrally formed with the metal insert 12 at the anchoring portion 13. Adjacent to the anchoring portion 13 is the peripheral portion 15 of the metal insert 12. A gas strut (not shown) can be connected to the ball strut 22. The overmolding of the metal insert 12 with the structural part 24 and the rib 14 may include that at least the peripheral portion 15 of the metal insert is embedded within thermoplastic material.

FIG. 3A is an illustration of an embodiment of a vehicle component 100 having a metal insert 12 for anchoring a strut component 22 (e.g., a ball strut). The second insert surface is shown to be overmolded with multiple ribs 14. These multiple ribs form a network 37 of ribs that also extend over the thermoplastic part 24. In this way, the ribs 14 may act as reinforcement ribs of the thermoplastic part 24. FIG. 3B is a cross-sectional of the vehicle component of FIG. 3A along line A-A' shown in FIG. 3A. The vehicle component includes a metal insert 12 having an anchoring portion 13 (see FIG. 3B) and a peripheral portion 15. The thermoplastic structural part 24 (e.g., a doorframe) is overmolded onto a first surface of the metal insert 12. The thermoplastic rib 14 and a thermoplastic boss 20 (see FIG. 3B) are overmolded onto a second surface of the metal insert 12. The thermoplastic rib 14 is part of a network of ribs 37. A ball strut 22 is integral with the metal insert 12 at the anchoring portion 13. A gas strut (not shown) can be connected to ball strut 22. With reference to FIGS. 2 and 3B, the ball strut 22 being combined with the metal insert 12 can eliminate a step in assembly of the vehicle component 100.

EXAMPLES

Metal inserts for anchoring strut components were modeled as illustrated in FIGS. 4A-D and simulation tested in Examples 1-4, respectively. Each metal insert 70, 80, 90, 100 included two circular anchoring portions 72, 82, 92, 102 and a peripheral portion 74, 84, 94, 104. On each of the metal inserts 70, 80, 90, 100 was an integral ball strut (not shown) for connection to a gas strut (not shown) at one anchoring portion 72, 82, 92, 102 and a bump strut (not shown) attached at the other anchoring portion 72, 82, 92, 102.

Figure 4A:
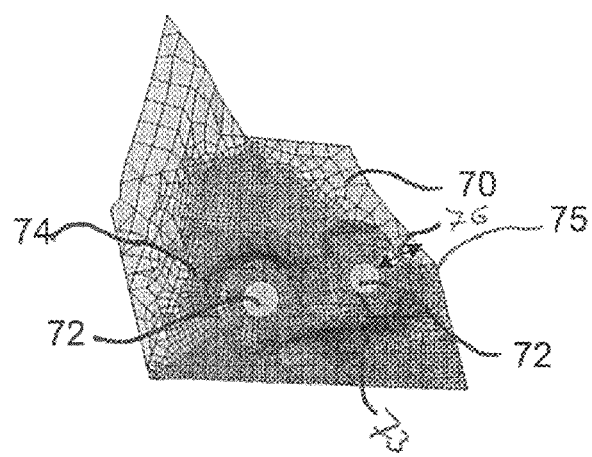
FIGS. 4A-D illustrate metal inserts in various sizes and shapes.

FIG. 4A shows a large metal insert used in Example 1. The two anchoring portions 72 each had a radius of 6 mm. An exterior edge 75 of peripheral portion 74 of metal insert 70 was a minimum radial distance 76 of 20 mm from an edge 73 of anchoring portion 72 of metal insert 70. The anchoring portion is assumed to be rigid in the model, such that for the simulation, the geometry of the anchoring portion 72 does not need to be included, only the location of the anchoring portion, the force applied on the anchoring portion, and where the anchoring portion attached to the metal insert 12 need to be specified.

Figure 4B:
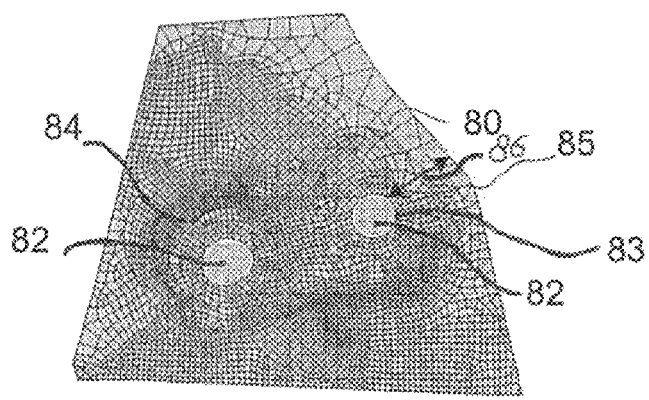

FIG. 4B shows the medium sized metal insert 80 used in Example 2. The two anchoring portions 82 each had a radius of 6 mm. An exterior edge 85 of peripheral portion 84 of metal insert 80 was a minimum radial distance 86 of 20 mm from an edge 83 of anchoring portion 82 of metal insert 80.

Figure 4C:
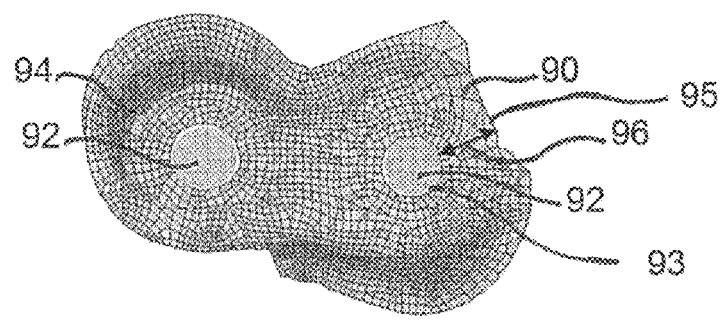

FIG. 4C shows the small metal insert 90 used in Example 3. The two anchoring portions 92 each had a radius of 6 mm. An exterior edge 95 of peripheral portion 94 of metal insert 90 was a minimum radial distance 96 of 20 mm from an edge 93 of anchoring portion 92 of metal insert 90.

Figure 4D:
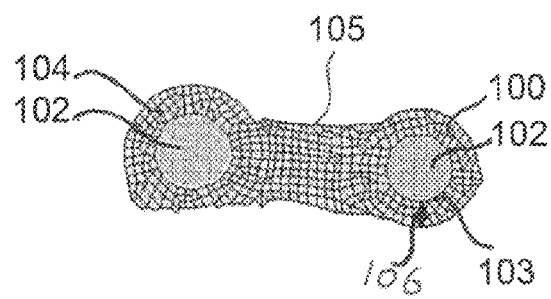

FIG. 4D shows the very small metal insert 100 used in Example 4. The two anchoring portions 102 each had a radius of 6 mm. An exterior edge 105 of peripheral portion 104 of metal insert 100 was a minimum radial distance 106 of 4 mm from an edge 103 of anchoring portion 102 of metal insert 100. While FIGS. 4A-4D illustrate two anchoring portions 102, an embodiment can include one anchoring portion and optionally a hole for a stop (e.g., not a ball strut).

Comparative Example 5 comprises a vehicle component as shown in FIG. 1A in which no metal insert was used. Rather, a strut component was attached to bolt, which is screwed onto a threaded metal cylinder and overmolded with a thermoplastic boss.

Figure 5:
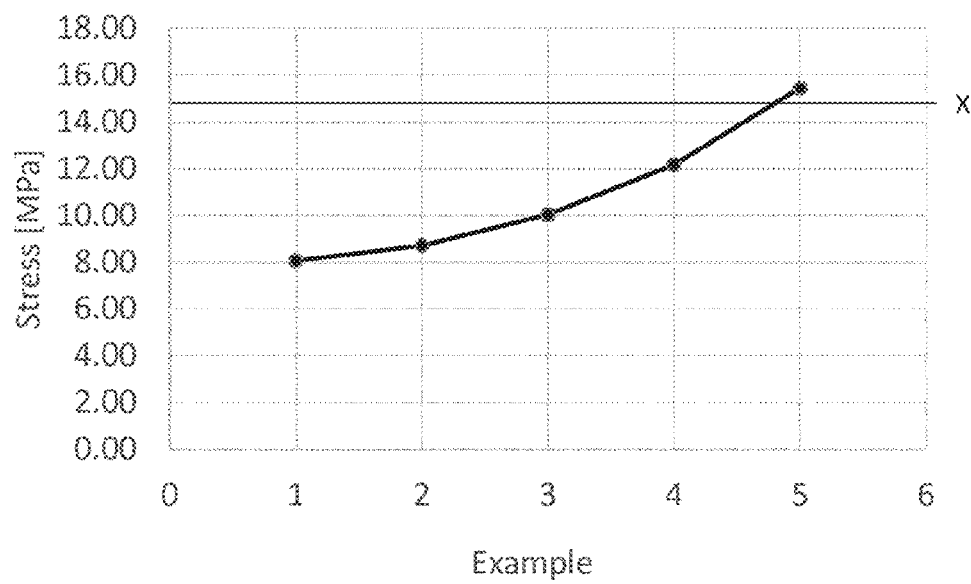
FIG. 5 is a graphical illustration of the local stress levels in the vehicle component at the location of the metal inserts of FIGS. 4A-D and without metal inserts.

Each metal insert 70, 80, 90, 100 was simulation tested in the system illustrated in FIG. 2 (e.g., the metal insert illustrated in FIG. 2 was substituted with each metal insert 70, 80, 90, 100). The stress levels were measured using a static elastic finite element simulation applying 600 N of force on the ball strut perpendicular to the axis connecting the ball strut and the metal insert, resulting in a (bending) moment on the metal insert plane. Each metal insert was steel with a thickness of 1.5 millimeters (mm). As illustrated in FIG. 3A, thermoplastic ribs were modeled to form a network including triangular spaces between the thermoplastic ribs. Each of the thermoplastic ribs was modeled as long glass fiber reinforced polypropylene (comprising 40 volume percent (vol. %) glass fiber) with a height of ranging from 20-40 millimeters (mm), a thickness of 1.5 mm average (not taking into account the draft angle), and a length of 20 to 60 mm. The results are illustrated in FIG. 5, in which X denotes the critical stress level, which is determined assuming 20-year lifetime of the article at 60° C. under given load without failure. The graph in FIG. 5 shows the stress levels (y-axis) for each example (example numbers on x-axis), decreasing in size with increasing stress levels.

As shown in FIG. 5, stress increases as the minimum radial distances decreased and the critical stress level was reached in Comparative Example 5. Thus, all the metal inserts simulation tested in Examples 1-4 were capable of anchoring a ball strut while providing improved, e.g., decreased, stress level under the critical stress level compared to Comparative Example 5.

Figure 6:
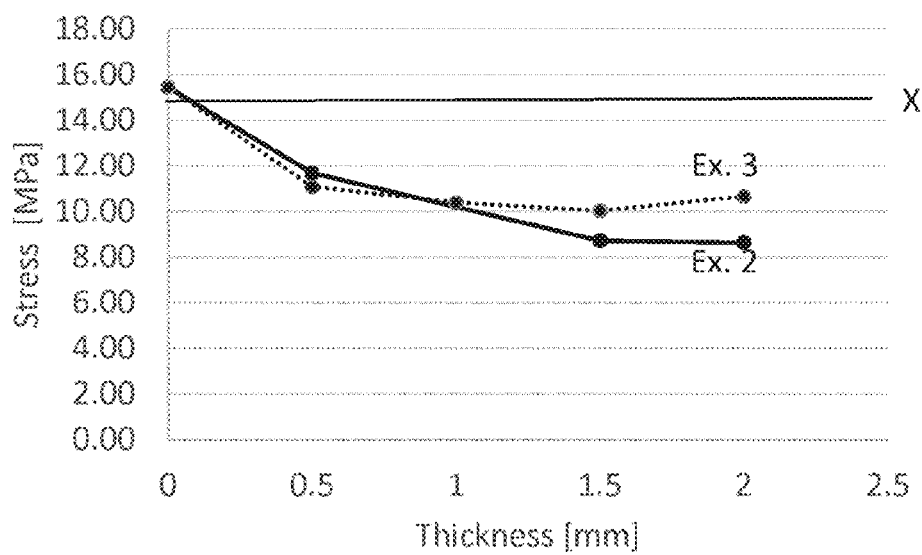
FIG. 6 is a graphical illustration of the local stress levels in the vehicle component at the location of the metal inserts of FIGS. 4B and 4C, for various thicknesses.

In FIG. 6 the metal inserts modeled in Examples 2 and 3, respectively, were each taken with varying metal insert thicknesses of 0.5 mm, 1 mm, 1.5 mm, and 2.0 mm. The metal inserts were simulation tested for force levels in the manner described for Examples 1-5. As shown in FIG. 6, the thickness of the metal insert could be decreased to 0.1 mm without reaching the critical stress level X.

Figure 7:
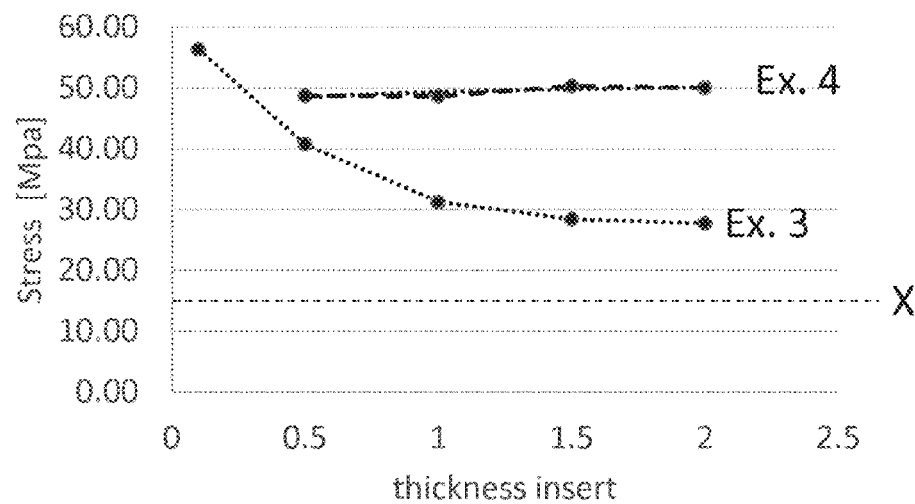
FIG. 7 is a graphical illustration of the local stress levels in the vehicle component at the location of the metal inserts of FIGS. 4C and 4D, for various thicknesses.

FIG. 7 shows a graphical illustration of the local stress levels in the vehicle component at the location of the metal inserts of FIGS. 4C and 4D, Examples 3 and 4, respectively, for various thicknesses. The metal inserts of Examples 4 and 3, respectively, were each modeled with varying metal insert thicknesses of 0.5 mm, 1 mm, 1.5 mm, and 2.0 mm. The metal inserts were simulation tested in the vehicle component illustrated in FIG. 3 but without thermoplastic ribs overmolded on the metal insert. The systems were simulation tested for force levels in the manner described for Examples 1-5. As shown in FIG. 7, all the components simulation tested exceeded the critical stress level. As shown, the increase in thickness for Example 4 does not show a significant lowering of the stress level in the vehicle component, irrespective of the non-use of the thermoplastic ribs. For Example 3, the increase in thickness does lower the stress levels significantly, but not below the initial maximum stress level of 15 MPa at X. As shown earlier in FIG. 5, the metal insert of Example 3 combined with thermoplastic ribs allows for a much lower stress level, well below the maximum stress level at X.

Figure 8:
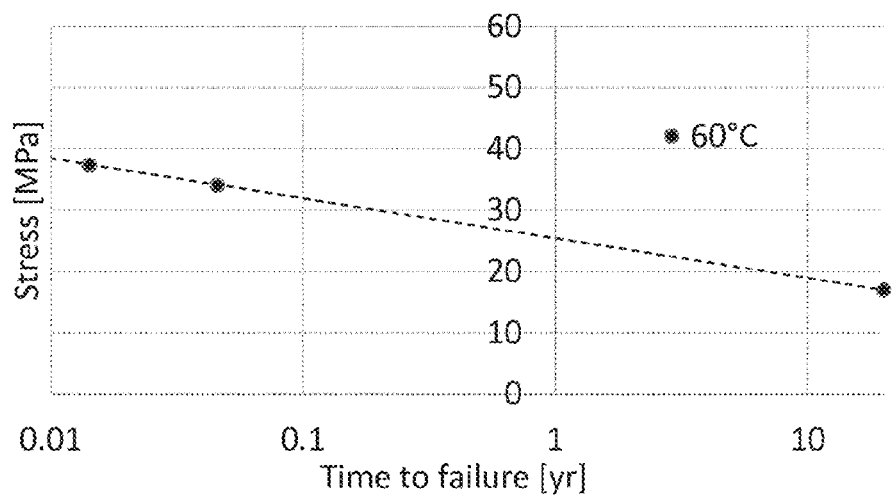
FIG. 8 is a graphical representation of stress versus time to failure for a thermoplastic vehicle component at 60 degrees Celsius.

FIG. 8 is a graphical representation of stress versus time to failure for a thermoplastic vehicle component at 60 degrees Celsius, made of a thermoplastic material typically used for such a thermoplastic vehicle component at 60 degrees Celsius. As the temperature is a constant, and the stress is varied, it is clearly shown that the higher the stress applied to a thermoplastic component, the shorter the time to failure is. Failure may be defined as the moment of fracture of the component, up to breaking point.

Figure 9:
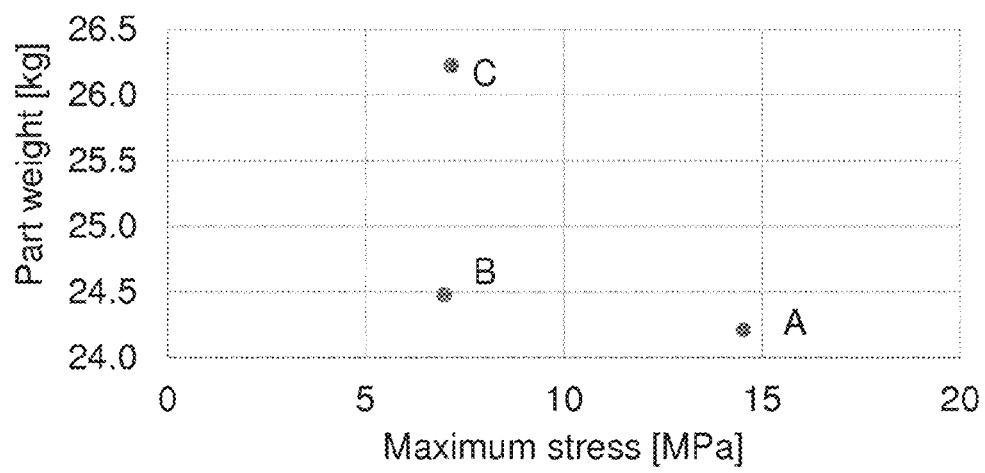
FIG. 9 is a graphical illustration of part weight versus maximum measured peak stress for three situations.

FIG. 9 is a graphical illustration of part weight versus maximum measured peak stress for three situations. Situation A shows the maximum peak stress versus weight of the vehicle component for the Comparative Example 5. Situation B shows the maximum peak stress versus weight of the vehicle component for a relatively small, overmolded metal insert, such as shown in FIGS. 4C and 4D. Situation C shows the maximum peak stress versus weight of the vehicle component for a relatively large overmolded metal insert, such as shown in FIGS. 4A and 4B.

The results indicate that an improvement in creep life time of thermoplastic structural parts loaded by continuous forces can be realized by a metal insert having a radial distance from an exterior edge of a peripheral portion of the metal insert to an edge of a ball strut location of, for example, 5 mm and a thickness of the metal insert of, for example, 0.1 mm, combined with overmolded ribbing.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

The invention claimed is:

1. A vehicle component, comprising:
   a thermoplastic part;
   a metal insert having an anchoring portion, a peripheral portion, and a first insert surface and an opposite second insert surface, wherein the first surface is overmolded by the thermoplastic part,
   a thermoplastic rib overmolded on a second surface of the metal insert the rib extending from the second surface and being at least partly adjacent to the thermoplastic part, wherein the thermoplastic rib is provided with a thermoplastic boss and/or a thermoplastic guest; and
   a strut component attached to the metal insert at the anchoring portion on the first surface of the metal insert.

2. The vehicle component of claim 1, wherein an exterior edge of the peripheral portion is at least a minimum planar distance from an edge of the anchoring portion closest to said exterior edge of the peripheral portion, wherein the minimum planar distance is 3.0 mm to 50 mm.

3. The vehicle component of claim 1, wherein a thickness of the metal insert is at least 0.05 and at max 5 mm.

4. The vehicle component of claim 1, wherein the strut component is welded to, clinched or integrally formed with the metal insert at the anchoring portion.

5. A vehicle component, comprising:
   a thermoplastic part;
   a metal insert having an anchoring portion, a peripheral portion, and a first insert surface and an opposite second insert surface, wherein the first surface is overmolded by the thermoplastic part,
   a thermoplastic rib overmolded on a second surface of the metal insert the rib extending from the second surface and being at least partly adjacent to the thermoplastic part; and
   a strut component attached to the metal insert at the anchoring portion on the first surface of the metal insert,
   wherein the strut component comprises a ball strut, a gas strut, or a combination comprising at least one of the foregoing.

6. The vehicle component of claim 1, wherein the metal insert comprises stainless steel, titanium, iron, nickel, copper, aluminum, tin, or a combination comprising at least one of the foregoing.

7. The vehicle component of claim 1, wherein the second surface is overmolded with a plurality of thermoplastic ribs.

8. The vehicle component of claim 1, wherein the thermoplastic rib overmolded on a second surface of the metal insert forms part of a reinforcement rib extending over at least part of the thermoplastic part.

9. The vehicle component of claim 1, further comprising a network of thermoplastic ribs connected to a lateral side of the thermoplastic rib and extending from the thermoplastic rib over at least part of the thermoplastic part.

10. The vehicle component of claim 1, wherein the thermoplastic rib, the thermoplastic boss and/or the thermoplastic gusset is adjacent to the anchoring portion.

11. The vehicle component of claim 1, wherein the thermoplastic part and the thermoplastic rib comprise dissimilar but compatible thermoplastic materials.

12. The vehicle component of claim 1, comprising at least one of polyamide, polycarbonate, polyester, polyetherimide, or polyolefin.

13. A vehicle component, comprising:
   a thermoplastic part;
   a metal insert having an anchoring portion, a peripheral portion, and a first insert surface and an opposite second insert surface, wherein the first surface is overmolded by the thermoplastic part,
   a thermoplastic rib overmolded on a second surface of the metal insert the rib extending from the second surface and being at least partly adjacent to the thermoplastic part; and
   a strut component attached to the metal insert at the anchoring portion on the first surface of the metal insert,
   wherein the vehicle component is a tailgate, a lift gate, a tail lift, a door or a hood.

14. A vehicle component, comprising:
   a thermoplastic part;
   a metal insert having an anchoring portion, a peripheral portion, and a first insert surface and an opposite second insert surface, wherein the first surface is overmolded by the thermoplastic part,
   a thermoplastic rib overmolded on a second surface of the metal insert the rib extending from the second surface and being at least partly adjacent to the thermoplastic part; and
   a strut component attached to the metal insert at the anchoring portion on the first surface of the metal insert,
   wherein the vehicle component is a tailgate, wherein the thermoplastic part forms a thermoplastic inner structure of the tailgate, wherein the thermoplastic part comprises a tailgate window opening in which a window glazing part of the tailgate is placable, and wherein the metal inserts are distributed around or adjacent to the tailgate window opening.

15. A vehicle comprising the vehicle component, comprising:
a thermoplastic part;
a metal insert having an anchoring portion, a peripheral portion, and a first insert surface and an opposite second insert surface, wherein the first surface is overmolded by the thermoplastic part,
a thermoplastic rib overmolded on a second surface of the metal insert the rib extending from the second surface and being at least partly adjacent to the thermoplastic part, wherein the thermoplastic rib is provided with a thermoplastic boss and/or a thermoplastic gusset; and
a strut component attached to the metal insert at the anchoring portion on the first surface of the metal insert, and
wherein the vehicle is one of a railway vehicle, a marine vehicle, a road vehicle, or an aircraft.

16. A vehicle component, comprising:
a thermoplastic part;
a metal insert having an anchoring portion, a peripheral portion, and a first insert surface and an opposite second insert surface, wherein the first surface is overmolded by the thermoplastic part;
a thermoplastic rib overmolded on a second surface of the metal insert the rib extending from the second surface and being at least partly adjacent to the thermoplastic part, wherein the thermoplastic rib is provided with a thermoplastic boss and/or a thermoplastic gusset; wherein the thermoplastic rib overmolded on a second surface of the metal insert forms part of a reinforcement rib extending over at least part of the thermoplastic part; and
a strut component attached to the metal insert at the anchoring portion on the first surface of the metal insert.

17. The vehicle component of claim 16, wherein an exterior edge of the peripheral portion is at least a minimum planar distance from an edge of the anchoring portion closest to said exterior edge of the peripheral portion of 3.0 mm to 50 mm.

18. The vehicle component of claim 16, wherein a thickness of the metal insert is at least 0.05 and at max 5 mm.

* * * * *